(No Model.)

H. B. CORRIDEAN.
INCUBATOR.

No. 587,646. Patented Aug. 3, 1897.

Witnesses:
H. B. Hallock
S. S. Williamson

Inventor
Harry B. Corridean
by Geo. H. Holgate
Attorney

# UNITED STATES PATENT OFFICE.

HARRY B. CORRIDEAN, OF ELKTON, MARYLAND.

INCUBATOR.

SPECIFICATION forming part of Letters Patent No. 587,646, dated August 3, 1897.

Application filed September 12, 1896. Serial No. 605,572. (No model.)

*To all whom it may concern:*

Be it known that I, HARRY B. CORRIDEAN, a citizen of the United States, residing at Elkton, in the county of Cecil and State of Maryland, have invented certain new and useful Improvements in Incubators, of which the following is a specification.

My invention relates to a new and useful improvement in incubators, and has for its object to so construct such an apparatus as to greatly facilitate the manipulations thereof necessary to hatch eggs and raise the chickens after being hatched, and also to so arrange the several compartments and heating-chambers as to utilize almost the entire heat generated within the lamp-chamber and so retain said heat at an even temperature as to obviate the necessity of a continued use of the lamp, which, as is well understood, will greatly expedite the handling of the apparatus, and especially where the number of eggs to be hatched is such as not to warrant constant attendance.

With these ends in view my invention consists in the details of construction and combination of elements hereinafter set forth, and then specifically designated by the claim.

In order that those skilled in the art to which this invention appertains may understand how to make and use the same, I will describe its construction and operation in detail, referring by number to the accompanying drawings, forming a part of this specification, and in which—

Figure 1:
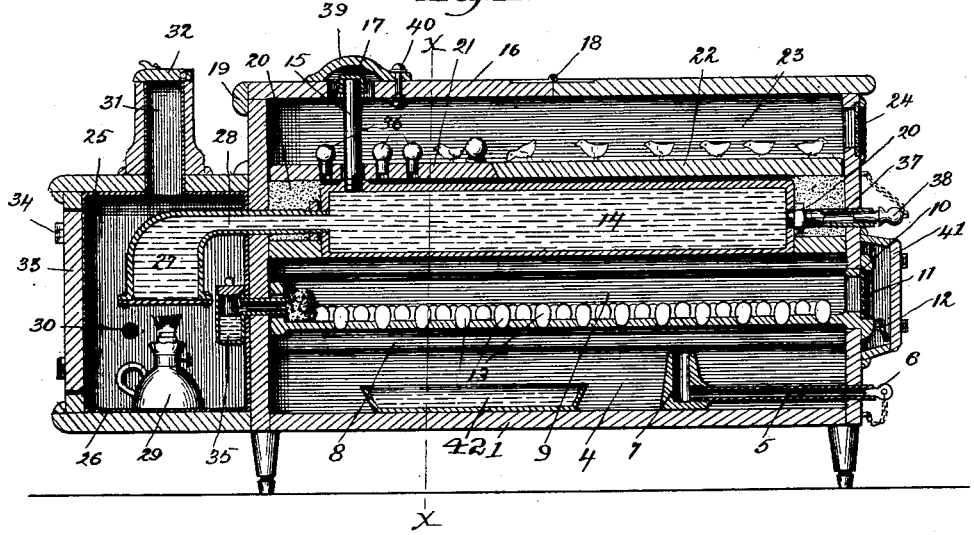
Figure 2:
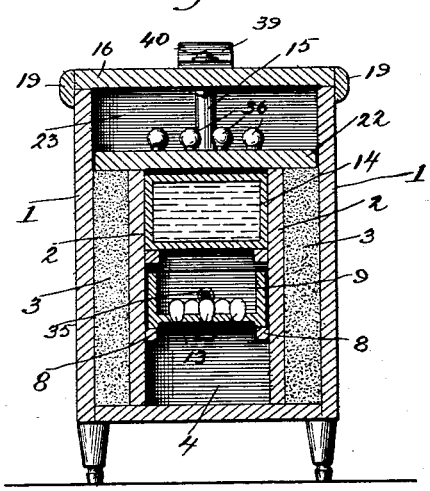

Figure 1 is a longitudinal section of my improved incubator, and Fig. 2 a cross-section at the line $x\ x$.

Referring to the drawings in detail, 1 represents the casing, which is preferably of rectangular shape, and the interior of this casing is divided into a number of compartments.

2 are upright partitions which run longitudinally of the casing and at such a distance from the sides thereof as to provide narrow compartments, in which may be placed a suitable heat-insulating material 3, such as sawdust. These partitions also form the central compartment 4, which runs the entire length of the casing, and the lower portion thereof serves as a storage for air and is also provided with the ventilating-tube 5, the outer end of which may be closed by a plug 6 or other suitable device, the inner end of said tube being threaded into the stand-pipe 7.

The cleats 8 are secured to the inner walls of the partitions 2 and serve to support the tray 9, which is adapted to slide in and out of the compartment 4 upon these cleats, and the tray has fitted to its outer end a flanged head 10, which serves to close the opening through which the tray passes when the latter is within its compartment, and for the purposes of observation this hood is provided with a pane of glass 11, the ring 12 serving as a handle by means of which the tray may be slid to and fro. The bottom of the tray is perforated with holes of sufficient size to receive the points of the eggs 13 in order that said eggs may be placed in the positions shown, which in the art of incubating is known to be the most advantageous position for an egg to stand during the process of hatching.

Immediately above the tray is located a tank 14, which serves as a reservoir for holding the water, by which the heat is to be transmitted from the lamp to the several compartments of the casing, and leading upward from this reservoir is a tube 15, which projects through the cover 16, so that the tank may be filled when occasion requires or the vapor generated from the water may escape, and the outlet to this tube is regulated by a cap 17. The cover 16 is preferably made in two sections and hinged at 18, each section being provided with flanges 19, whereby it is guided into place upon the casing and held against accidental removal, the flanges also serving to prevent the escape of the heated air. Between each end of the tank and the casing is interposed a quantity of heat-insulating material 20 to aid in retaining the heat transmitted to said tank, and the tank is protected from above by the horizontal partition 21 and the section 22 thereof, which is removable, and when in place rests upon the upright partitions 2, as clearly shown in Fig. 2. The compartment 23, which is thus formed by the partition 21, is for the accommodation of the chickens after they have been hatched, and access is gained to this compartment by the swinging open of one of the sections of the hinged cover; but the condition of the chickens may be observed without disturbing the cover through the pane of glass 24, set in one end of the casing in line with this compartment.

The heating of the apparatus is provided for by the lamp-chamber 25, the inner walls of which are preferably lined with asbestos 26 or other suitable non-combustible material, which at the same time has a tendency to retain the heat generated within the lamp-chamber. Within the lamp-chamber is arranged a heater 27 of sufficient size to contain the required amount of water, the temperature of which is to be raised and transmitted to the tank with which said heater connects by the extension 28 by convection. A lamp 29 is placed beneath the heater, so that the flame thereon will heat the water within said heater to the desired temperature, and air is supplied to the chamber for the purposes of combustion through the holes 30, and the heated air and gases are permitted to pass off through the chimney 31, the latter having a cover 32, by means of which it may be closed when the lamp is extinguished or removed to prevent the escape of the heat from the apparatus. Access is had to the lamp-chamber by means of the door 33, which is hinged at 34 to said chamber, and suitable devices, such as blocks or valves, (not shown,) for closing the holes 30 when occasion requires.

From this description the operation of my improvement will be obviously as follows: Eggs to be hatched are placed within the holes in the tray, as before described, and this tray is passed into the compartment 4. A lighted lamp is then placed within the chamber 25 beneath the heater, and the heat from said lamp will raise the temperature of the water in said heater, which by convection will be transmitted to the tank and from thence by radiation and conduction to all parts of the interior of the casing. A certain amount of the heat within the chamber 25 will be absorbed by water-tank 35 and conveyed to the compartment in which the tray is located by vapor, thus combining with the heat transmitted from the tank a certain amount of moisture to bring about the best effects upon the eggs, it of course being understood that when the lamp is burning within the chamber the cap 32 is swung back, so as to open the upper end of the chimney 31, and also the holes 30 are opened.

When the proper temperature has been reached, which by experiment has been demonstrated to be between 98° and 103°, the lamp may be extinguished or removed, when the heat then contained within the apparatus and water within the tank and heater will be sufficient to maintain this temperature with little or no decrease for from five to thirty-six hours; and, as is obvious, this is of great advantage to small operations, in that constant attendance is not needed to bring about most satisfactory results, for the reason that when a temperature of 103° has been reached no further attention is required until this temperature has fallen to 98°, so that a person may be absent from the apparatus at least twenty-four hours without liability of mishap to the eggs contained therein.

When the eggs first begin to hatch, a certain amount of fresh air is needed for the respiration of the chickens, and this is supplied by the withdrawal of the plugs 6, and when one or more of the chickens have gained sufficient strength to be removed from the tray in which they were hatched this is accomplished by drawing the tray partially from its compartment, and the chickens are then placed in the compartment 23 by the opening of one section of the cover. While I have represented in the drawings chickens in this compartment standing upon the partition 22, in practice it is preferable to cover said partition with straw, cotton-batting, or other suitable material to protect the chickens from injury by contact with the partition and also to permit them to retain a larger amount of the natural heat of their bodies by partially embedding themselves in said cover. A greater or less amount of heat may be transmitted to the compartment 23 by the withdrawal or replacing of any number of the plugs 36, which close suitable openings through the partition 22, and when these plugs are withdrawn it will be seen that a certain amount of heat from the tank will pass therethrough to the compartment 23.

The water within the tank may be withdrawn at any time through the tube 37 by removing the plug 38 therefrom, and more or less ventilation may be had within the compartment 23 by the manipulation of the hood 39, which is pivoted at 40 to the cover, and this hood also serves to close the upper end of the tube 15, so that vapor passing therefrom may remain within the interior of the apparatus. If found desirable, a housing 41 may be placed over the end of the tray and provided with a hinged door, so that access can be had to said tray, or that the latter may be entirely withdrawn from the apparatus, and yet when the tray is in place this housing may be closed, thus further retaining the heat, which would otherwise be lost by radiation.

To prevent an undue amount of moisture reaching the eggs at one end of the tray, a sponge may be placed over the end of the tube which leads from the tank 35, which will absorb the moisture generated therein and distribute it more evenly than would otherwise be the case, and also should it be found desirable a pan 42 or other device for holding water may be placed in the bottom of the compartment 4, thereby further adding moisture by evaporation to the compartment in which the eggs are being hatched.

I am aware that a number of modifications might be made in the design here shown without departing from the spirit of my invention, and I therefore do not wish to be limited to the exact details of construction, but reserve the right to make such alterations and additions as fall within the scope of the ordinary workman.

Having thus fully described my invention, what I claim as new and useful is—

In a device of the character described, a casing, upright partitions secured therein, a packing of heat-insulating material between the partitions and casing, a perforated tray removably secured between the partitions, a transparent head on the tray, a closed tank containing water above the tray, a tube leading from the tank through the top of the casing, a cap on the end of the tube, a door formed in the top of the casing, a horizontal partition having a removable section located above the tank, plugs fitting in openings of the horizontal partition, a lamp-chamber, a non-combustible lining therein, a lamp in the chamber, a heater above the lamp connected to the tank, a chimney on the lamp-chamber, a cover therefor, and a door formed in the lamp-chamber, as and for the purpose described.

In testimony whereof I have hereunto affixed my signature in the presence of two subscribing witnesses.

HARRY B. CORRIDEAN.

Witnesses:
S. S. WILLIAMSON,
G. L. BENNETT.